US012021381B2

United States Patent
Ho et al.

(10) Patent No.: US 12,021,381 B2
(45) Date of Patent: Jun. 25, 2024

(54) DEVICE FOR ELECTRICALLY INTERCONNECTING DC MICROGRID WITH HIGHER VOLTAGE DC BUS AND RELATED METHODS

(71) Applicant: University of Manitoba, Winnipeg (CA)

(72) Inventors: Ngai Man Ho, Winnipeg (CA); Dong Li, Winnipeg (CA); King Man Siu, Winnipeg (CA)

(73) Assignee: University of Manitoba, Winnipeg (CA)

( * ) Notice: Subject to any disclaimer, the term of this patent is extended or adjusted under 35 U.S.C. 154(b) by 23 days.

(21) Appl. No.: 17/926,227

(22) PCT Filed: May 4, 2021

(86) PCT No.: PCT/CA2021/050619
§ 371 (c)(1),
(2) Date: Nov. 18, 2022

(87) PCT Pub. No.: WO2021/237337
PCT Pub. Date: Dec. 2, 2021

(65) Prior Publication Data
US 2023/0198296 A1    Jun. 22, 2023

Related U.S. Application Data

(60) Provisional application No. 63/029,913, filed on May 26, 2020.

(51) Int. Cl.
*H02J 13/00* (2006.01)
*H02J 15/00* (2006.01)

(52) U.S. Cl.
CPC .. *H02J 13/00034* (2020.01); *H02J 13/00016* (2020.01); *H02J 13/00022* (2020.01);
(Continued)

(58) Field of Classification Search
CPC .......... H02J 13/00034; H02J 13/00036; H02J 13/00022; H02J 13/00016; H02J 15/00; H02J 2310/10
See application file for complete search history.

(56) References Cited

U.S. PATENT DOCUMENTS 9,240,687 B2    1/2016  Carralero et al.
9,373,965 B2    6/2016  Liu et al.
(Continued)

FOREIGN PATENT DOCUMENTS

CN    108023347 A    5/2018
CN    108281987 A    7/2018
(Continued)

*Primary Examiner* — Carlos Amaya
(74) *Attorney, Agent, or Firm* — Kyle R Satterthate; Ryan W Dupuis; Ade & Company Inc.

(57) ABSTRACT

A device for electrically connecting a direct current (DC) microgrid to a DC bus of an electrical power network, which is operating at a higher voltage than the microgrid, comprises a pair of electrical port each configured for connection with either the DC bus or the microgrid; a DC-DC power converter operatively interconnecting the electrical ports for power transmission therebetween from a first voltage at the port connected to the DC bus to a lower second voltage at the port connected to the DC microgrid; a DC circuit breaker connected between the DC-DC power converter and one of the electrical ports for selectively conducting current therebetween; and a controller which is configured to communicate with constituent devices in the DC microgrid as well as a control center representative of the electrical power network in order to exchange information about electrical energy consumption in the DC microgrid and the larger network.

24 Claims, 3 Drawing Sheets

(52) U.S. Cl.
CPC ........ *H02J 13/00036* (2020.01); *H02J 15/00* (2013.01); *H02J 2310/10* (2020.01)

(56) References Cited

U.S. PATENT DOCUMENTS

| | | |
|---|---|---|
| 9,459,643 B2 | 10/2016 | Miller et al. |
| 2010/0264739 A1 | 10/2010 | Errington |
| 2013/0057200 A1 | 3/2013 | Potts et al. |
| 2015/0084563 A1 | 3/2015 | Lucas et al. |
| 2018/0054055 A1* | 2/2018 | Majumder ................ H02J 3/06 |
| 2019/0074696 A1 | 3/2019 | Sachs et al. |

FOREIGN PATENT DOCUMENTS

| | | |
|---|---|---|
| CN | 111525546 A | 8/2020 |
| WO | WO2020113932 A1 | 6/2020 |

\* cited by examiner

DEVICE FOR ELECTRICALLY INTERCONNECTING DC MICROGRID WITH HIGHER VOLTAGE DC BUS AND RELATED METHODS

This application is a national phase filing of PCT/CA2021/050619 and claims priority from U.S. Provisional Application Ser. No. 63/029,913 filed May 26, 2020.

FIELD OF THE INVENTION

The present invention relates generally to power management in direct current (DC) electrical power networks, and more particularly to a power router device configured to electrically connect a DC microgrid to a higher voltage DC bus in a manner which provides a modular topology in the DC electrical power network such that power flow within same can be suitably managed.

BACKGROUND

Several solutions have been proposed for managing power flow within a respective DC microgrid or among several interconnected microgrids forming a cluster thereof.

For example, U.S. Pat. No. 9,459,643 by Miller et al. shows interconnection of a plurality of DC microgrids by directly electrically interconnecting or tying each pair of the DC microgrids.

In another example, U.S. Pat. No. 9,240,687 by Carralero et al. shows a DC microgrid system in which a power router device is provided for each electrical device therein whether a generator or a load or an energy storage device.

Further examples which are generally relevant include U.S. Pat. No. 9,373,965, CN 108281987 and U.S. Patent Application Publication 2010/0264739.

SUMMARY OF THE INVENTION

According to an aspect of the invention there is provided a method for managing flow of electrical power in an electrical power network, wherein the electrical power network comprises a plurality of direct current (DC) microgrids electrically connected to a common DC bus operating at a higher voltage than the DC microgrids, wherein each microgrid includes at least one power generation device configured to generate electrical power, at least one energy storage device configured to store electrical energy and at least one electrical load configured to consume electrical power, the method comprising:

providing, for each DC microgrid, a power router device for electrically interconnecting the DC microgrid with the common DC bus to enable transfer of electrical power therebetween, wherein the power router device is in operative communication with said at least one power generation device of the DC microgrid, said at least one energy storage device of the DC microgrid and said at least one electrical load of the DC microgrid in order (i) to receive information about usage of electrical energy thereby, and (ii) to send instructions for regulating said usage of electrical energy;

using a control center which is in operative communication with the power router devices respectively associated with the DC microgrids:

receiving, from each power router device, information about net electrical energy consumption in the associated DC microgrid;

determining net electrical energy consumption in the electrical power network based on the received information about net electrical energy consumption in each of the DC microgrids; and communicating, to each power router device, the net electrical energy consumption of the electrical power network so that the power router device is enabled to determine a respective power flow between the associated DC microgrid and the DC bus to increase availability of electrical power in the electrical power network.

This provides a hierarchical approach which is scalable depending on a number of microgrids connected to the DC bus for optimizing power flow in the whole of the electrical power system.

When the DC bus is electrically connected to a utility grid, the method preferably further includes a step of, using the control center, receiving, from the utility grid, information about net electrical energy consumption in the utility grid for subsequently determining the net electrical energy consumption of the electrical power network.

When the power router devices are configured to electrically disconnect the respectively associated DC microgrids from the DC bus, the method preferably further includes a step of, using the control center, communicating, to each power router device, instruction to electrically disconnect the associated DC microgrid from the DC bus in response to detection of an electrical fault in the electrical power network.

The method may optionally further include the step of, using the control center, communicating, to each power router device, instruction to exchange a fixed amount of power with the DC bus in the order of a prescribed value provided by the control center.

According to another aspect of the invention there is provided a method for managing flow of electrical power in an electrical power network, wherein the electrical power network comprises a plurality of direct current (DC) microgrids electrically connected to a common DC bus operating at a higher voltage than the DC microgrids, wherein each DC microgrid includes at least one power generation device configured to generate electrical power, at least one energy storage device configured to store electrical energy and at least one electrical load configured to consume electrical power, the method comprising:

providing, for each DC microgrid, a power router device for electrically interconnecting the DC microgrid with the common DC bus to enable transfer of electrical power therebetween, wherein the power router device is in operative communication with said at least one power generation device of the DC microgrid, said at least one energy storage device of the DC microgrid and said at least one electrical load of the DC microgrid in order (i) to receive information about usage of electrical energy thereby, and (ii) to send instructions for regulating said usage of electrical energy;

using the power router device of an associated one of the DC microgrids:

receiving the information about usage of electrical energy in the associated DC microgrid;

determining net electrical energy consumption in the associated DC microgrid based on the received information about usage of electrical energy therein;

communicating, to a control center which is in operative communication with the power router devices respectively associated with the DC microgrids, the net electrical energy consumption of the associated DC microgrid;

receiving, from the control center, information about net electrical energy consumption in the electrical power network which is determined based on the communicated net electrical energy consumption from each power router device;

determining, for the associated DC microgrid, a reference power flow between the associated DC microgrid and the DC bus to increase availability of electrical power in the electrical power network; and communicating, to the associated DC microgrid, instructions to achieve the reference power flow.

Preferably the method further includes, using the power router device of the associated DC microgrid, electrically disconnecting the associated DC microgrid from the DC bus in response to instruction received from the control center after detection of an electrical fault in the electrical power network.

In at least one arrangement, determining the reference power flow comprises operating the associated DC microgrid in a variable power exchange state such that a variable amount of electrical power is exchangeable with the DC bus.

In one arrangement, the variable power exchange change comprises operating the associated DC microgrid at a prescribed voltage such that the variable amount of power that is exchangeable is responsive thereto.

In one such arrangement, determination to operate the associated DC microgrid at a prescribed voltage is responsive to determination that a state of charge of the associated DC microgrid lies outside a prescribed range.

In another arrangement, the variable amount power exchange state comprises supporting the common DC bus at a prescribed voltage such that the variable amount of power that is exchangeable is responsive thereto.

In one such arrangement, determination to support the common DC bus at a prescribed voltage is responsive to determination that a state of charge of the associated DC microgrid lies within a prescribed range.

Preferably the variable amount of power that is exchangeable is determined based on a state of charge of the associated DC microgrid. That is, when the state of charge lies outside a prescribed range, the associated DC microgrid is operated in a power balance state by operating the DC microgrid at the prescribed voltage to return the state of charge to being within the prescribed range. Conversely, when the state of charge of the associated DC microgrid lies within the prescribed range, the DC microgrid is operated in a DC bus voltage control mode to maintain the prescribed voltage of the DC bus.

In at least one arrangement, determining the reference power flow comprises operating the associated DC microgrid in a fixed power exchange state such that a fixed amount of electrical power is exchangeable with the DC bus.

According to yet another aspect of the invention there is provided a device for electrically connecting a direct current (DC) microgrid to a DC bus of an electrical power network, wherein the DC bus is configured to operate at a higher voltage than the DC microgrid, wherein the DC microgrid includes at least one power generation device configured to generate electrical power, at least one energy storage device configured to store electrical energy and at least one electrical load configured to consume electrical power, the device comprising:

a first electrical port configured for connecting to the DC bus to enable exchange of electrical power therebetween;

a second electrical port configured for connecting to the DC microgrid to enable exchange of electrical power therebetween;

a DC-DC converter operatively interconnecting the first and second electrical ports and configured to transmit electrical power therebetween, the DC-DC converter being configured to convert the electrical power between a first voltage level at the first electrical port and a second voltage level at the second electrical port that is lower than the first voltage level;

a DC circuit breaker operatively connected between the DC-DC converter and one of the first and second electrical ports, the DC circuit breaker being configured to selectively conduct electrical current therebetween; and a controller which is configured:

to communicate with said at least one power generation device, said at least one energy storage device and said at least one electrical load to receive therefrom information about usage of electrical energy in the DC microgrid;

to communicate with a control center associated with the electrical power network in order (i) to transmit thereto the information about the usage of electrical energy in the DC microgrid so as to enable the control center to determine net electrical energy consumption in the electrical power network, and (ii) to receive therefrom information about the net electrical energy consumption in the electrical power network; and to regulate said at least one power generation device, said at least one energy storage device and said at least one electrical load to achieve a desired power flow between the DC microgrid and the DC bus to increase availability of electrical power in the electrical power network based on the net electrical energy consumption determined by the control center.

Preferably, the controller comprises distinct communication channels for communicating with the control center and with said at least one power generation device, said at least one energy storage device and said at least one electrical load of the DC microgrid.

Preferably, the DC-DC converter comprises a transformer to provide isolation between the first and second electrical ports.

In at least one arrangement, the DC-DC converter comprises a pair of DC-AC bidirectional power electronic converters which are electrically interconnected by a transformer.

Preferably, the controller is configured to determine net electrical energy consumption in the associated DC microgrid to be communicated to the control center for subsequent determination of the net electrical energy consumption in the electrical power network.

Preferably, the controller is configured to communicate with the DC-DC converter to receive information about flow of electrical power between the first and second electrical ports and a condition thereof and to provide control commands to the DC-DC converter for regulating said flow of electrical power.

Preferably, the controller is configured to communicate with the DC circuit breaker to cause the DC circuit breaker to cease conducting electric current in the event of an electrical fault.

In at least one arrangement, the controller is configured to operate the DC-DC converter in a microgrid voltage control mode in which an exchange of electrical power between the DC microgrid and the DC bus is dynamically regulated based on the information received from the control center in order to maintain a prescribed voltage at the second electrical port for the associated DC microgrid. The amount of power exchanged is typically regulated by the controller. The amount of electrical power exchanged may vary during operation in this mode. Typically, in the microgrid voltage control mode a voltage at the second electrical port to be connected to the DC microgrid is maintained at the prescribed voltage value while a voltage at the first electrical port which is to be connected to the DC bus is floating.

Preferably, the controller is configured to operate the DC-DC converter in the microgrid voltage control mode in response to determination that a state of charge of the associated DC microgrid lies outside a prescribed range.

In at least one arrangement, the controller is configured to operate the DC-DC converter in a DC bus voltage control mode in which an exchange of electrical power between the DC microgrid and the DC bus is dynamically regulated based on the information received from the control center in order to maintain a prescribed voltage at the first electrical port for the DC bus. The amount of power exchanged is typically regulated by the controller. The amount of electrical power exchanged may vary during operation in this mode. Typically, in the DC bus voltage control mode a voltage at the first electrical port to be connected to the DC bus is maintained at the prescribed voltage value while a voltage at the second electrical port which is to be connected to the DC microgrid is floating.

Preferably, the controller is configured to operate in the DC bus voltage control mode in response to determination that the state of charge of the associated DC microgrid lies within the prescribed range.

In at least one arrangement, the controller is configured to operate in a constant power mode in which an exchange of electrical power between the DC microgrid and the DC bus is fixed at a prescribed value determined by the control center.

BRIEF DESCRIPTION OF THE DRAWINGS

The invention will now be described in conjunction with the accompanying drawings in which.

In the drawings like characters of reference indicate corresponding parts in the different figures.

DETAILED DESCRIPTION

The accompanying figures show a device 10 for electrically connecting a direct current (DC) microgrid 1 to a DC bus 2 of an electrical power network, where the DC bus 2 is configured to operate at a higher voltage than the DC microgrid 1, typically in the medium voltage (MV) range as conventionally understood in the art with respect to electrical power transmission. Generally speaking, the DC microgrids 1 are considered to be downstream of the MV DC bus 2 as they are operated at a lower voltage than the bus 2, which is in accordance with terminology from conventional electrical power transmission systems in which a majority of power flows from buses at higher voltages, which are closer to the source of power generation, to buses and systems operating at lower voltages, which are closer to the end-user. The DC bus 2 may be connected to other electrical power subsystems operating at a higher voltage than the bus 2, for example as shown in FIG. 4, so as to be considered upstream of same.

Referring back to FIG. 1, the DC microgrid 1 that is to be connected to the DC bus 2 can be configured as a standalone electrical power network as it generally comprises at least one power generation device 4 configured to generate electrical power, such as a photovoltaic panel or a wind turbine; at least one energy storage device 5, which may be referred to hereinafter as ESS for convenient reference, and which is configured to store electrical energy and accordingly to provide backup power for the system, such as a capacitor or battery; and at least one electrical load 6 configured to consume or electrical power to do work, such as a motor. The foregoing electrical devices of the DC microgrid are electrically interconnected within the microgrid on a common DC bus 8, so as to be generally arranged in electrically parallel relation to each other, where the bus 8 is operated at a prescribed, generally low voltage (LV) value. It will be appreciated that, preferably, the power generation device 4 is configured to generate electrical power from a renewable energy source, the availability of which is considered less controllable than for a non-renewable energy source such as a fossil fuel which can be supplied on demand. As such, these power generation devices may be referred to herein as RES. Furthermore, it will be appreciated that the power generation devices 4 are configured to output electrical power as DC regardless of the form in which the power is generated.

Figure 1:
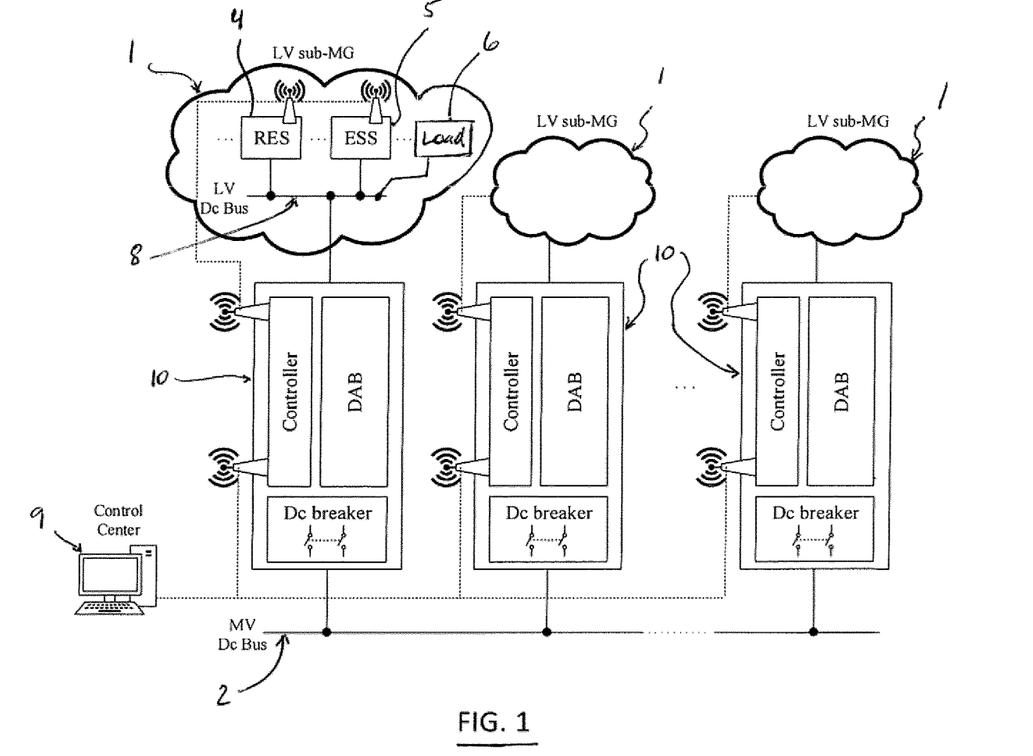
FIG. 1 is a schematic diagram of a plurality of DC microgrids respectively interconnected to a DC bus by a device according to the present invention.

Each of the electrical devices 4-6 of the microgrid 1, whether generating or storing or consuming electrical energy, are configured for data communication with other data transmission devices such that basic information about electrical energy usage by the electrical device is available for subsequent retrieval by another data communication device or for transmission by the originating electrical device to such a receiving communication device. Furthermore, the electrical devices 4-6 of the DC microgrid are configured to receive and to respond to control commands so that the exchange of electrical power between the respective device 4, 5 or 6 and the DC microgrid, that is the DC bus 8, can be regulated.

When multiple DC microgrids are connected to a common DC bus such that power can be selectively exchanged between the microgrids or other electrically connected subsystems within the electrical power network, there is provided a control center 9 which is associated with the electrical power network for determining how to balance power flow in the whole of the electrical power network. The control center 9 determines net electrical energy consumption in the whole network based on measurements of energy consumption in the network.

Figure 2:
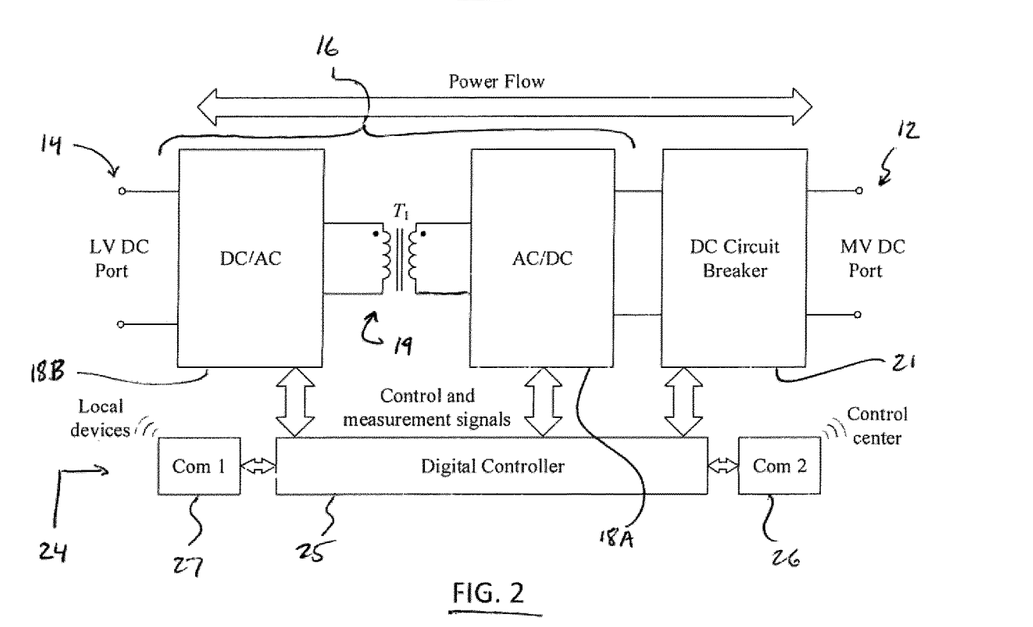
FIG. 2 is a schematic diagram of the device of FIG. 1.

Referring to FIG. 2, the device 10 comprises a first electrical port 12 configured for connecting to the DC bus 2 to enable exchange of electrical power therebetween and a second electrical port 14 configured for connecting to the DC microgrid 1 to enable exchange of electrical power therebetween. It will be appreciated that the device 10 is referred to hereinafter as a power router device as its primary purpose is to control exchange of power between the microgrid 1 and the bus 2.

The power router device 10 further includes a DC-DC converter 16 operatively interconnecting the first and second electrical ports 12, 14 and configured to transmit electrical power therebetween. Further, the converter 16 is configured to convert the electrical power between a first voltage level at the first electrical port 12 and a second voltage level at the second electrical port 14 that is lower than the first voltage level.

In the illustrated arrangement, the DC-DC converter 16 comprises a pair of DC-AC bidirectional power electronic converters 18A and 18B which are electrically interconnected by a transformer 19 which provides electrical isolation between the first and second electrical ports 12, 14. More specifically, the DC-AC converter 18A having its DC side substantially directly electrically connected to the higher voltage electrical port, which is that indicated at 12, is of the high voltage, low current type while the DC-AC converter 18B having its DC side substantially directly electrically connected to the lower voltage electrical port, which is that indicated at 14, is of the lower voltage, high current type. Furthermore, the transformer 19 is of the high frequency type.

The DC-DC converter 16 is controllable by a device or entity distinct therefrom for exchanging different amounts of electrical power between the ports 12, 14 and as such is configured for data communication with data communication devices such that information about flow of electrical power between the device electrical ports 12, 14, for example measurement signals, and a condition of the power being exchanged is available for subsequent retrieval by another data communication device or for transmission by the electrical device to such a communication device. Furthermore, the DC-DC converter 16 is configured to receive and to respond to control commands for regulating the flow of electrical power occurring through the converter 16.

Thus any electrical power flowing between the microgrid 1 and the bus 2 is channeled through the device 10 and the amount exchanged is controllable thereby.

The device 10 further includes a DC circuit breaker 21 operatively connected between the DC-DC converter 16 and one of the first and second electrical ports 12, 14, which in the case of the illustrated arrangement is the port 12 electrically connected to the DC bus 2 which is more likely to be affected by an electrical fault occurring in the electrical power network before the fault is transmitted therethrough to the downstream DC microgrid 1. The DC circuit breaker 21 is configured to selectively conduct electrical current between the electrical ports 12, 14. Typically, the DC circuit breaker is configured in an on state in which it conducts electrical current, and, in response to control commands transmitted or otherwise applied thereto provided in the event of an electrical fault, the breaker 21 is configurable in an off state to cease conducting electric current.

Similarly to the DC-DC converter, the DC circuit breaker 21 is controllable by a device or entity distinct therefrom for selectively conducting electric current between the electrical ports 12, 14 of the device and as such is configured for data communication with data communication devices primarily for receiving and consequently responding to control commands to operate in a desired one of the on and off states.

Yet further, the device 10 includes a controller 24 which is basically a computing device 25 having a processor and a memory operatively coupled thereto with data transmission functionality in the form of at least one communication channel, such as that indicated at 26 or 27, which is operatively associated with the computing device 25 for transmitting data to and receiving data from other data communicating devices.

Figure 3:
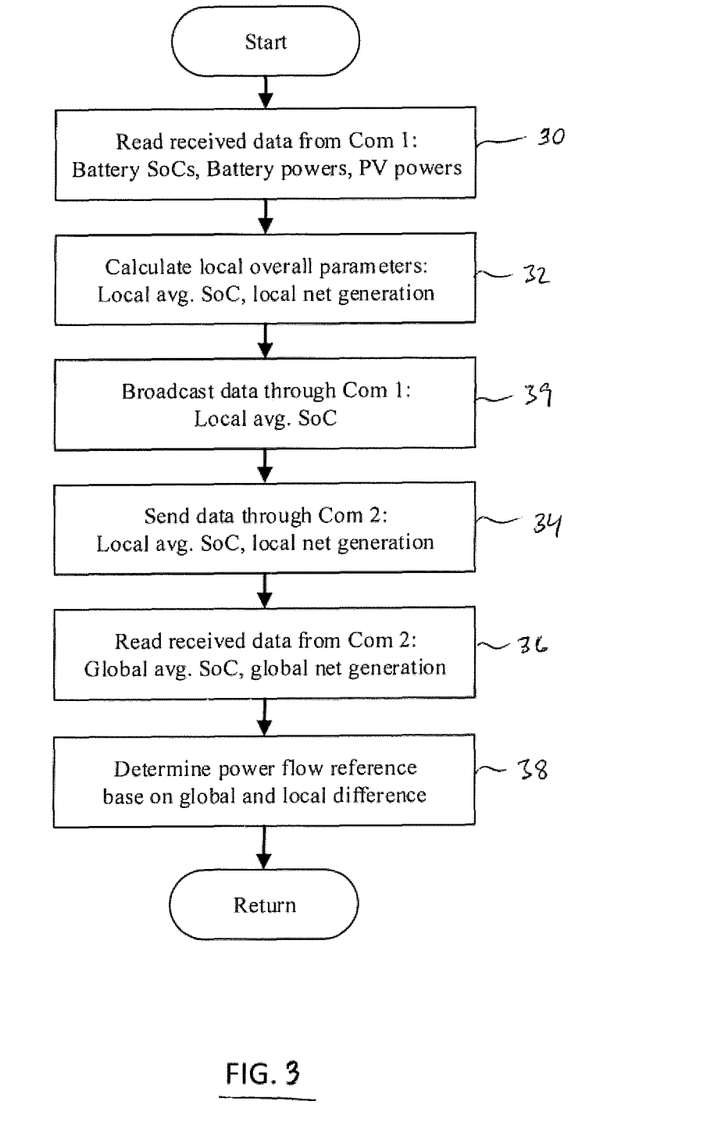
FIG. 3 is a flowchart illustration of operation of the device of FIG. 1.
Figure 4:
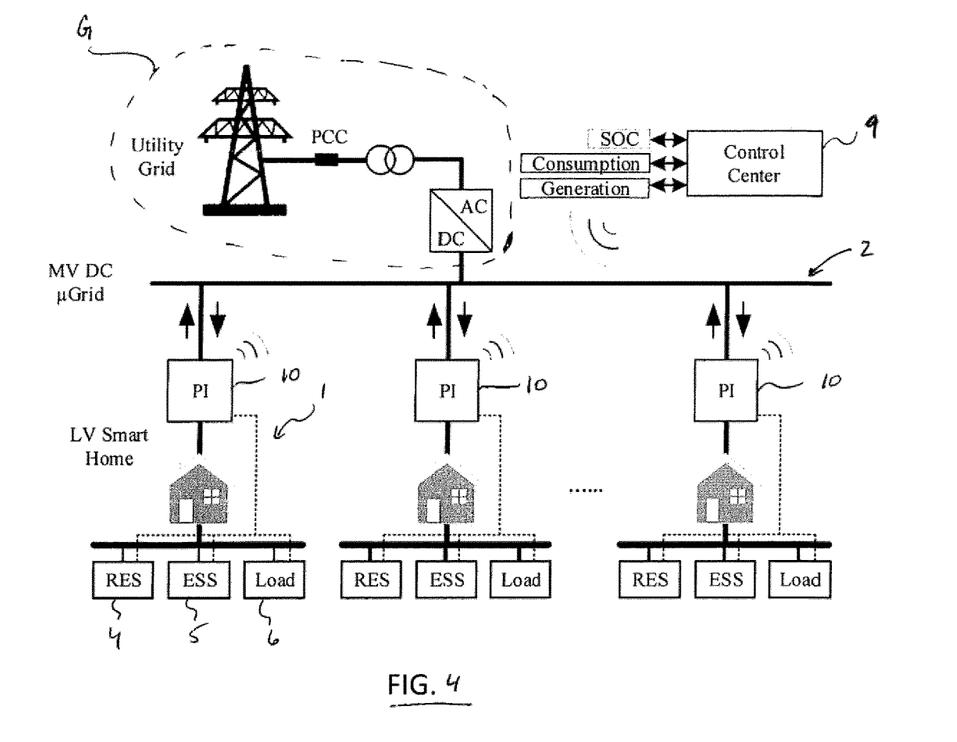
FIG. 4 is a schematic diagram of a plurality of DC microgrids connected to a utility grid in the manner shown in FIG. 1.

As schematically illustrated in FIG. 3, the controller 24 is configured:
  (i) to communicate with each power generation device 4, each energy storage device 5 and each electrical load 6 of the respective DC microgrid to which the device 10 is connected at the second port 14 in order to receive from these electrical devices information about usage of electrical energy in the DC microgrid, as represented by steps 30 and 32 in FIG. 3;
  (ii) to communicate with the control center 9 in order
    (a) to transmit thereto the information about the usage of electrical energy in the DC microgrid 1 so as to enable the control center to determine net electrical energy consumption in the electrical power network, as represented by step 34, and
    (b) to receive therefrom information about the net electrical energy consumption in the electrical power network, as represented by step 36; and
  (iii) to regulate the power generation devices 4, the energy storage devices 5 and the electrical loads 6 within the DC microgrid with which the power router device 10 is associated in order to achieve a desired power flow between the DC microgrid 1 and the DC bus 2 to increase availability of electrical power in the electrical power network based on the current net electrical energy consumption as determined by the control center 9, which is generally represented by step 38.

It will be appreciated that local parameters for the microgrid 1 as determined by the power router device 10 may be communicated to the constituent devices 4-6 at 39 so that individual devices can self-regulate in response to the current local parameters.

More specifically, in regard to (i) above, the controller 24 typically collects electrical energy usage information from the constituent devices in the microgrid in order to determine, for the microgrid as a whole, net local electrical energy consumption so as to compare local power generation to local power consumption and local states of charge. This summary information processed by the controller 24 is then communicated to the control center 9, in conjunction with point (ii)(a) above, for subsequent processing at the control center 9.

The control center 9 receives information representative of each of the subsystems within the electrical power network, such as microgrids 1, in which power generation and power consumption can be adjusted to balance power in the whole of the electrical power network while still satisfying local energy consumption needs unknown to the control center 9.

Thus the control center 9 only has access to energy usage information representative of entire subsystems, which are represented by the power router devices 10, and is able to provide thereto energy usage information representative of the whole electrical power network. The control center 9 leaves the task of determining how to achieve the power balance in the electrical power network to the power router device representative of the respective electrical subsystem, as the power router device 10 has access to both local and global information.

Basically, the controller 24 is configured to communicate with the constituent electrical devices of the DC microgrid, to which the power router device 10 is connected and subsequently with which it is associated, so as to measure electrical energy usage thereby and subsequently determine the same for the whole of the DC microgrid 1. Typically this includes obtaining data about parameters such as batteries' states of charge, battery powers and powers of photovoltaic (PV) panels.

The usage of electrical energy in the respective microgrid 1 as determined by the controller 24 is subsequently communicated to the control center 9 which obtains the same type of data from all other power router devices 10 respectively associated with connected microgrids 1 to determine a net electrical energy consumption in the electrical power network.

The determined net electrical energy consumption is then communicated from the control center 9 to each of the power router devices 10 so that each can individually determine, for their associated microgrid, a reference power flow between the microgrid 1 and the DC bus 2 to increase or improve availability of electrical power in the electrical power network. In some cases this means providing a power flow to obtain net zero power consumption in the electrical power network, so that power flow therein can be balanced without an overproduction of electrical energy or conversely an insufficient amount of same.

Referring back to FIG. 2, in order to obtain the desired reference power flow the controller 24 is operatively communicated with the DC-DC converter 16, so as to be configured to communicate therewith, to regulate the flow of power between the electrical ports 12, 14 of the power router device.

The controller 24 comprises distinct communication channels 26, 27 for communicating with the control center 9 and with the electrical devices 4-6 of the DC microgrid 1, which are optimized for data transmission over different prescribed distances. More specifically, a first communication channel 26 which is configured for communication with the control center 9 is suited for long distance data transmission, and is preferably wire-based which is suited for communication with a single entity, and a second communication channel 27 which is configured for communication with the constituent electrical devices 4-6 of the microgrid 1 is suited for short distance data transmission, and preferably is of a wireless type which is suited for communicating with multiple entities.

In the event there is an electrical fault in the electrical power network, the controller 24 is operatively communicated with the DC circuit breaker 21, so as to be configured to communicate therewith, to cause the DC circuit breaker to cease conducting electric current in the event of an electrical fault.

In addition to controlling electrical energy consumption in the connected DC microgrid 1, the controller 24 is configured to operate the DC-DC converter 16 of the power router device 10 in a plurality of different modes including:
  a microgrid voltage control mode in which an exchange of electrical power between the DC microgrid and the DC bus is dynamically regulated by the controller based on the information received from the control center in order to maintain a prescribed voltage at the second electrical port for the associated DC microgrid, which may also be referred to herein as a power imbalance state of a variable power exchange state in respect of the associated DC microgrid;
  a DC bus voltage control mode an exchange of electrical power between the DC microgrid and the DC bus is dynamically regulated by the controller based on the information received from the control center in order to maintain a prescribed voltage at the first electrical port for the common DC bus, which may also be referred to herein as a power balance state of a variable power exchange state in respect of the associated DC microgrid; and
  a constant power mode in which exchange of electrical power between the DC microgrid and the DC bus is fixed at a prescribed value determined by the control center, which may also be referred to as a fixed power exchange state in respect of the associated DC microgrid.

In the microgrid voltage control mode, the amount of electrical power exchanged may vary over a duration of operation in this mode. Furthermore, in this mode a voltage at the second electrical port 14 connected to the DC microgrid is maintained at a prescribed value set by the controller, for example the value at which the electrical energy storage devices of the associated DC microgrid are operating at maximum capacity leaving a variable excess power produced within the DC microgrid to be bled off to the DC bus 2 which is connected to the first electrical port 12. The voltage of the bus-connected electrical port 12 is floating relative to the device 10, that is it not regulated thereby, and instead is regulated by other electrical devices connected to the DC bus 2, such as other DC microgrids connected via respectively associated power router devices or the utility grid. It will be appreciated that, in some arrangements, determination to operate in the microgrid voltage control mode is responsive to determination that a state of charge of the associated DC microgrid lies outside a prescribed range, which is based on, for example, an ability to readily locally provide backup power in the event a power generation device fails or is offline. In other arrangements the microgrid voltage control mode is responsive to instruction received from the control center to operate in this mode irrespective of the local state of charge of the associated DC microgrid. The state of charge refers to the amount of electrical energy which is stored in all of the energy storage devices of the associated DC microgrid.

The microgrid-voltage control mode may also be referred to herein as a power balance mode in respect of the associated DC microgrid as the state of charge therein lies outside the prescribed range and is intended to be returned to same by maintaining the second electrical port 14 at which the DC microgrid is connected to the device 10 at the prescribed voltage value.

In the DC bus voltage control mode the amount of electrical power exchanged may vary over a duration of operation in this mode. Furthermore, in this mode a voltage at the second electrical port 14 connected to the DC microgrid is maintained at a prescribed value by the electrical energy storage devices 5 of the associated DC microgrid. The voltage of the bus-connected electrical port 12 is maintained at a prescribed value by the power router device 10 which may be set by the control center 9. In some arrangements, determination to operate in the DC bus voltage control mode is responsive to determination that the state of charge of the associated DC microgrid lies within the prescribed range, which is typically a local determination by the respective power router device. In other arrangements the DC bus voltage control mode is responsive to instruction received from the control center to operate in this mode irrespective of the local state of charge of the associated DC microgrid.

When operating in the microgrid or DC bus voltage control modes, both local and global parameters are used to determine the reference power flow which may be performed by the power router device 10 or the control center 9.

In the constant power mode the local electrical devices of the DC microgrid are operated by the controller 25 in a manner which provides a fixed excess or deficiency of local electrical power which is either bled to or drawn from the DC bus 2. Furthermore, in this mode the voltage at the first electrical port is floating so as to be regulated by other devices connected to the DC bus 2. Typically determination to operate in the constant power mode is responsive to instruction received from the control center to operate in this mode irrespective of the local state of charge, however preferably the state of charge of the associated DC microgrid is within the prescribed range.

Selecting one of the foregoing modes of operation is typically made at step 38 as shown in FIG. 2. Selection is typically left to the controller 25 based on the local state of charge of the associated DC microgrid, unless the control center 9 has indicated to the device 10 that a fixed amount of power is to be exchanged with the DC bus which is limited to when the associated DC microgrid's state of charge lies within the prescribed range. In the constant power mode the reference power flow is non-zero and fixed at the value determined and provided by the control center 9. In the microgrid and DC bus voltage control modes, the reference power flow between the associated DC microgrid and the DC bus is variable and responsive to a reference voltage, typically determined by the power router device 10, for a corresponding one of the electrical ports where a voltage thereof is to be maintained or fixed to a prescribed value to manipulate power flow.

In other words, the device 10 is a power interface (which may be abbreviated herein as PI) which connects a low-voltage dc bus (sub-MG) to a medium-voltage dc bus (upstream network). It controls power flow between two power networks and provides isolation and protection between two power networks. The smart power interface also works as a distributed control agent. On the one hand, it communicates with local devices inside the sub-MG and manages the power balance of the sub-MG in an optimized manner. On the other hand, it communicates with the control center of MV dc microgrid and manages power flow within the MV dc network.

The device 10 comprises a power stage module comprising a dual-active-bridge converter 16 (including a dc-ac stage 18A, a transformer 19 and an ac-dc stage 18B) and a dc circuit breaker 21. The device 10 further comprises a controller 24 which is implemented with a digital control card 25 with two communication channels 26, 27.

The smart power interface 10 comprises an integrated or built-in communication device, which can be a wired or wireless communication device. It is used to exchange data and instructions for coordinating energy sharing in the sub-MG, to report to a central controller (meaning the control center 9) about the status of the sub-MG and receive commands from central controller.

The device comprises at least one low-voltage direct current (DC) port which connects to a low-voltage dc microgrid, which is indicated at 14; at least one medium-voltage DC port which connects to a medium-voltage dc microgrid, which is indicated at 12; at least one circuit breaker 21; at least one transformer 19; and at least one communication device 26 or 27 which is configured to communicate with other devices 4-6 connected to low-voltage dc microgrid if applicable, and control center 9 of medium-voltage dc microgrid. The smart power interface can operate under one of the three modes, low-voltage side voltage control mode, medium-voltage side voltage control mode and constant power mode. The mode selection is preferably fully automatic based on information received from communication channels and local measurement.

In relation to the power router device 10, there is provided a novel method for managing flow of electrical power in the electrical power network which comprises the steps of:

providing, for each DC microgrid 1, a power router device 10 for electrically interconnecting the DC microgrid 1 with the common DC bus 2 to enable transfer of electrical power therebetween, wherein the power router device 10 is in operative communication with the constituent electrical devices 4-6 of the connected microgrid in order (i) to receive information about usage of electrical energy thereby, and (ii) to send instructions for regulating the usage of electrical energy; and from the perspective of the control center 9:
receiving, from each power router device, information about net electrical energy consumption in the associated DC microgrid;
determining net electrical energy consumption in the electrical power network based on the received information about net electrical energy consumption in each of the DC microgrids; and
communicating, to each power router device, the net electrical energy consumption of the electrical power network so that the power router device is enabled to determine a respective power flow between the associated DC microgrid and the DC bus to increase power availability in the electrical power network; or from the perspective of the respective power router device 10, as shown in FIG. 3:
receiving the information about usage of electrical energy in the associated DC microgrid;
determining net electrical energy consumption in the associated DC microgrid based on the received information about usage of electrical energy therein;
communicating, to a control center which is in operative communication with the power router devices respectively associated with the DC microgrids, the net electrical energy consumption of the associated DC microgrid;
receiving, from the control center, information about net electrical energy consumption in the electrical power network which is determined based on the communicated net electrical energy consumption from each power router device;
determining, for the associated DC microgrid, a reference power flow between the associated DC microgrid and the DC bus to increase availability of electrical power in the electrical power network; and
communicating, to the associated DC microgrid, instructions to achieve the power flow.

In response to detection of an electrical fault in the electrical power network the foregoing method further includes:

from the control center's perspective, communicating, to each power router device 10, instruction to electrically disconnect the associated DC microgrid 1 from the DC bus 2 in response to detection of an electrical fault in the electrical power network; and from the respective power router device's perspective, electrically disconnecting the associated DC microgrid from the DC bus in response to instruction received from the control center after detection of an electrical fault in the electrical power network.

When the DC bus 2 is electrically connected to a utility grid G as shown in FIG. 4, the method for managing power flow further includes a step of, using the control center 9, receiving, from the utility grid G, information about net electrical energy consumption in the utility grid G which is upstream from the DC bus as it is generally operating at a higher voltage than same for subsequently determining the net electrical energy consumption of the electrical power network now including the grid G.

Figure 5:
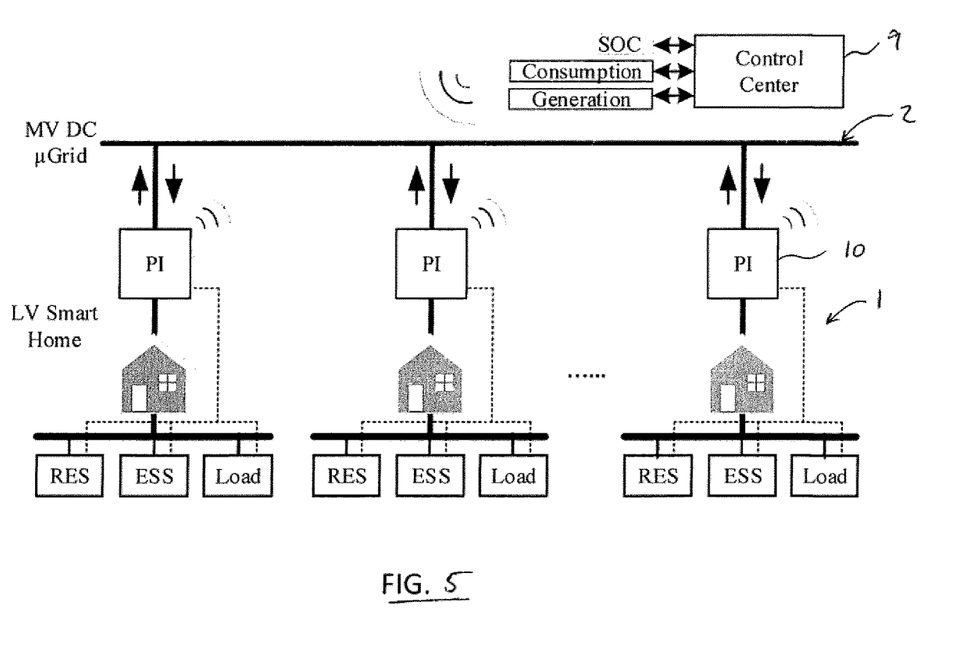
FIG. 5 is a schematic diagram similar to FIG. 4 except showing an off-grid network.

FIG. 5 shows that the electrical power network can also consist essentially of the generally low voltage DC microgrids connected to a common DC bus which is at a higher voltage that the microgrids in order to minimize transmission losses along same.

Thus the power router device 10 is arranged in one-to-one relationship with a respective DC microgrid so as act as a power channel and communication device on behalf of the DC microgrid. The power router device 10 collects data from the DC microgrid which is formed by a plurality of electrical devices, some of which generate electrical power and others which consume or store same, to be processed to determine parameters representative of the DC microgrid as a standalone entity and to be subsequently relayed to the control center 9 which is representative of the electrical power network including other DC microgrids and, in some instances, other electrical power subsystems. This provides a hierarchical approach to managing power flow in an electrical power network comprising at least one DC microgrid, which also is modular and scalable.

The advantages of this device include:

1) The controller, power converter, isolation and protection are integrated into a single device.

2) Infrastructure and methodology for controlling power flow of the overall electrical power network is simplified: the control center communicates by providing commands to each smart interface only, instead of considering every constituent electrical device thereof (such as RES, ESS, etc.). The microgrid 1, otherwise referred to herein as the sub-MG, can be managed by the smart interface 10 which can be treated as a black box to a portion of the electrical power network upstream relative to the respective microgrid.

3) The smart interface can be standardized with mass production.

The proposed smart power interface can be used to create a hierarchical microgrid system or interconnect microgrid clusters. The smart interface can significantly simplify the control system and increase system reliability and operation flexibility.

The scope of the claims should not be limited by the preferred embodiments set forth in the examples but should be given the broadest interpretation consistent with the specification as a whole.

The invention claimed is:

1. A method for managing flow of electrical power in an electrical power network, wherein the electrical power network comprises a plurality of direct current (DC) microgrids electrically connected to a common DC bus operating at a higher voltage than the DC microgrids, wherein each microgrid includes at least one power generation device configured to generate electrical power, at least one energy storage device configured to store electrical energy and at least one electrical load configured to consume electrical power, the method comprising:

providing, for each DC microgrid, a power router device for electrically interconnecting the DC microgrid with the common DC bus to enable transfer of electrical power therebetween, wherein the power router device is in operative communication with said at least one power generation device of the DC microgrid, said at least one energy storage device of the DC microgrid and said at least one electrical load of the DC microgrid in order (i) to receive information about usage of electrical energy thereby, and (ii) to send instructions for regulating said usage of electrical energy;

using a control center which is in operative communication with the power router devices respectively associated with the DC microgrids:

receiving, from each power router device, information about net electrical energy consumption in the associated DC microgrid;

determining net electrical energy consumption in the electrical power network based on the received information about net electrical energy consumption in each of the DC microgrids; and communicating, to each power router device, the net electrical energy consumption of the electrical power network so that the power router device is enabled to determine a respective power flow between the associated DC microgrid and the DC bus to increase availability of electrical power in the electrical power network.

2. The method of claim 1 wherein, when the DC bus is electrically connected to a utility grid, the method further includes:

using the control center, receiving, from the utility grid, information about net electrical energy consumption in the utility grid for subsequently determining the net electrical energy consumption of the electrical power network.

3. The method of claim 1 wherein, when the power router devices are configured to electrically disconnect the respectively associated DC microgrids from the DC bus, the method further includes:

using the control center, communicating, to each power router device, instruction to electrically disconnect the associated DC microgrid from the DC bus in response to detection of an electrical fault in the electrical power network.

4. The method of claim 1 further including:

using the control center, communicating, to each power router device, instruction to exchange a fixed amount of power with the DC bus in the order of a prescribed value provided by the control center.

5. A method for managing flow of electrical power in an electrical power network, wherein the electrical power network comprises a plurality of direct current (DC) microgrids electrically connected to a common DC bus operating at a higher voltage than the DC microgrids, wherein each DC microgrid includes at least one power generation device configured to generate electrical power, at least one energy storage device configured to store electrical energy and at least one electrical load configured to consume electrical power, the method comprising:

providing, for each DC microgrid, a power router device for electrically interconnecting the DC microgrid with the common DC bus to enable transfer of electrical power therebetween, wherein the power router device is in operative communication with said at least one power generation device of the DC microgrid, said at least one energy storage device of the DC microgrid and said at least one electrical load of the DC microgrid in order (i) to receive information about usage of electrical energy thereby, and (ii) to send instructions for regulating said usage of electrical energy;

using the power router device of an associated one of the DC microgrids:

receiving the information about usage of electrical energy in the associated DC microgrid;

determining net electrical energy consumption in the associated DC microgrid based on the received information about usage of electrical energy therein;

communicating, to a control center which is in operative communication with the power router devices respectively associated with the DC microgrids, the net electrical energy consumption of the associated DC microgrid;

receiving, from the control center, information about net electrical energy consumption in the electrical power network which is determined based on the communicated net electrical energy consumption from each power router device;

determining, for the associated DC microgrid, a reference power flow between the associated DC microgrid and the DC bus to increase availability of electrical power in the electrical power network; and communicating, to the associated DC microgrid, instructions to achieve the reference power flow.

6. The method of claim 5 further including:
using the power router device of the associated DC microgrid, electrically disconnecting the associated DC microgrid from the DC bus in response to instruction received from the control center after detection of an electrical fault in the electrical power network.

7. The method of claim 5 wherein determining the reference power flow comprises operating the associated DC microgrid in a variable power exchange state such that a variable amount of electrical power is exchangeable with the DC bus.

8. The method of claim 7 wherein the variable power exchange change comprises operating the associated DC microgrid at a prescribed voltage such that the variable amount of power that is exchangeable is responsive thereto.

9. The method of claim 8 wherein operating the associated DC microgrid at the prescribed voltage is responsive to determination that a state of charge of the associated DC microgrid lies outside a prescribed range.

10. The method of claim 7 wherein the variable amount power exchange state comprises supporting the common DC bus at a prescribed voltage such that the variable amount of power that is exchangeable is responsive thereto.

11. The method of claim 10 wherein supporting the common DC bus at the prescribed voltage is responsive to determination that a state of charge of the associated DC microgrid lies within a prescribed range.

12. The method of claim 5 wherein determining the reference power flow comprises operating the associated DC microgrid in a fixed power exchange state such that a fixed amount of electrical power is exchangeable with the DC bus.

13. A device for electrically connecting a direct current (DC) microgrid to a DC bus of an electrical power network, wherein the DC bus is configured to operate at a higher voltage than the DC microgrid, wherein the DC microgrid includes at least one power generation device configured to generate electrical power, at least one energy storage device configured to store electrical energy and at least one electrical load configured to consume electrical power, the device comprising:

a first electrical port configured for connecting to the DC bus to enable exchange of electrical power therebetween;

a second electrical port configured for connecting to the DC microgrid to enable exchange of electrical power therebetween;

a DC-DC converter operatively interconnecting the first and second electrical ports and configured to transmit electrical power therebetween, the DC-DC converter being configured to convert the electrical power between a first voltage level at the first electrical port and a second voltage level at the second electrical port that is lower than the first voltage level;

a DC circuit breaker operatively connected between the DC-DC converter and one of the first and second electrical ports, the DC circuit breaker being configured to selectively conduct electrical current therebetween; and a controller which is configured:
to communicate with said at least one power generation device, said at least one energy storage device and said at least one electrical load to receive therefrom information about usage of electrical energy in the DC microgrid;

to communicate with a control center associated with the electrical power network in order (i) to transmit thereto the information about the usage of electrical energy in the DC microgrid so as to enable the control center to determine net electrical energy consumption in the electrical power network, and (ii) to receive therefrom information about the net electrical energy consumption in the electrical power network; and to regulate said at least one power generation device, said at least one energy storage device and said at least one electrical load to achieve a desired power flow between the DC microgrid and the DC bus to increase availability of electrical power in the electrical power network based on the net electrical energy consumption determined by the control center.

14. The device of claim 13 wherein the controller comprises distinct communication channels for communicating with the control center and with said at least one power generation device, said at least one energy storage device and said at least one electrical load of the DC microgrid.

15. The device of claim 13 wherein the DC-DC converter comprises a transformer to provide isolation between the first and second electrical ports.

16. The device of claim 13 wherein the DC-DC converter comprises a pair of DC-AC bidirectional power electronic converters which are electrically interconnected by a transformer.

17. The device of claim 13 wherein the controller is configured to determine net electrical energy consumption in the associated DC microgrid to be communicated to the control center for subsequent determination of the net electrical energy consumption in the electrical power network.

18. The device of claim 13 wherein the controller is configured to communicate with the DC-DC converter to receive information about flow of electrical power between the first and second electrical ports and a condition thereof and to provide control commands to the DC-DC converter for regulating said flow of electrical power.

19. The device of claim 13 wherein the controller is configured to communicate with the DC circuit breaker to cause the DC circuit breaker to cease conducting electric current in the event of an electrical fault.

20. The device of claim 13 wherein the controller is configured to operate the DC-DC converter in a microgrid voltage control mode in which an exchange of electrical power between the associated DC microgrid and the DC bus is dynamically regulated based on the information received from the control center in order to maintain a prescribed voltage at the second electrical port for the associated DC microgrid.

21. The device of claim 20 wherein the controller is configured to operate in the microgrid voltage control mode in response to determination that a state of charge of the associated DC microgrid lies outside a prescribed range.

22. The device of claim 13 wherein the controller is configured to operate the DC-DC converter in a DC bus voltage control mode in which an exchange of electrical power between the DC microgrid and the DC bus is dynamically regulated based on the information received from the control center in order to maintain a prescribed voltage at the first electrical port for the DC bus.

23. The device of claim 22 wherein the controller is configured to operate in the DC bus voltage control mode in response to determination that a state of charge of the associated DC microgrid lies within a prescribed range.

24. The device of claim 13 wherein the controller is configured to operate the DC-DC converter in a constant power mode in which exchange of electrical power between the DC microgrid and the DC bus is fixed at a prescribed value determined by the control center.

* * * * *